Figures 1, 2, 13:
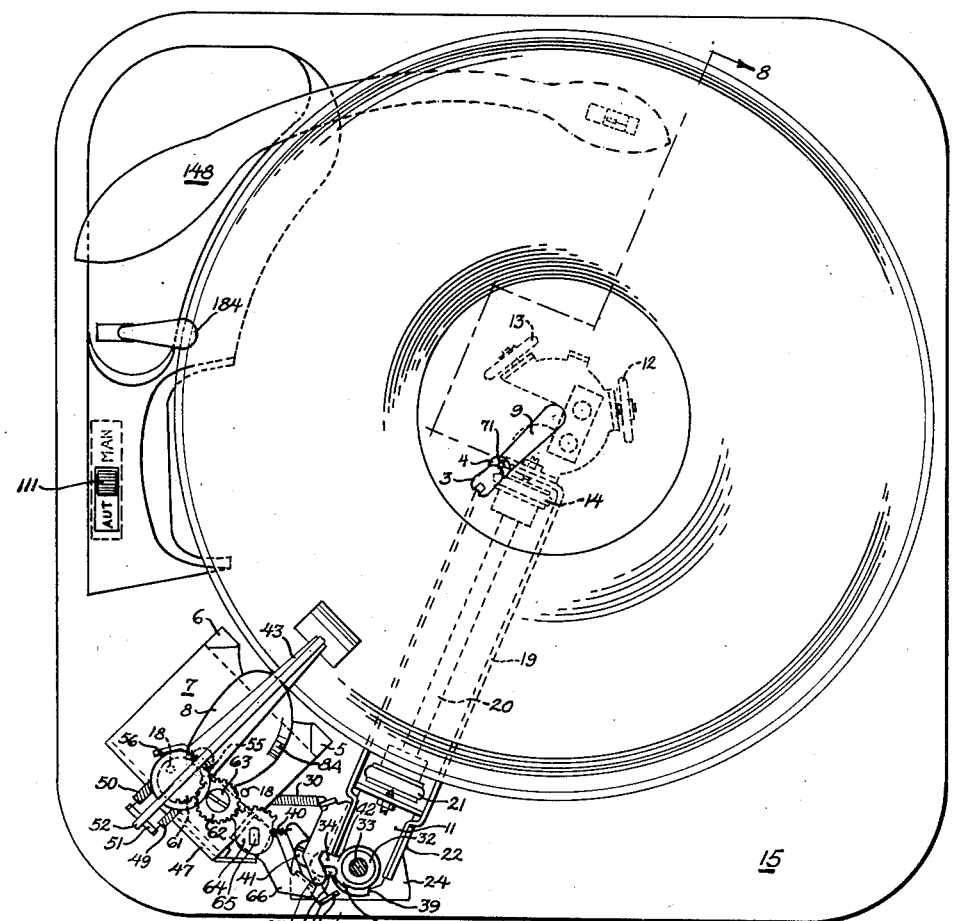

Dec. 23, 1952   R. A. MULLANEY ET AL   2,622,885
RECORD CHANGING APPARATUS
Filed Feb. 21, 1946   6 Sheets-Sheet 1

RALPH A. MULLANEY
KURT EMDE
HERBERT H. STEGLICH
INVENTORS.

BY David M. Davis
Frank E. Mauritz

THEIR ATTORNEYS

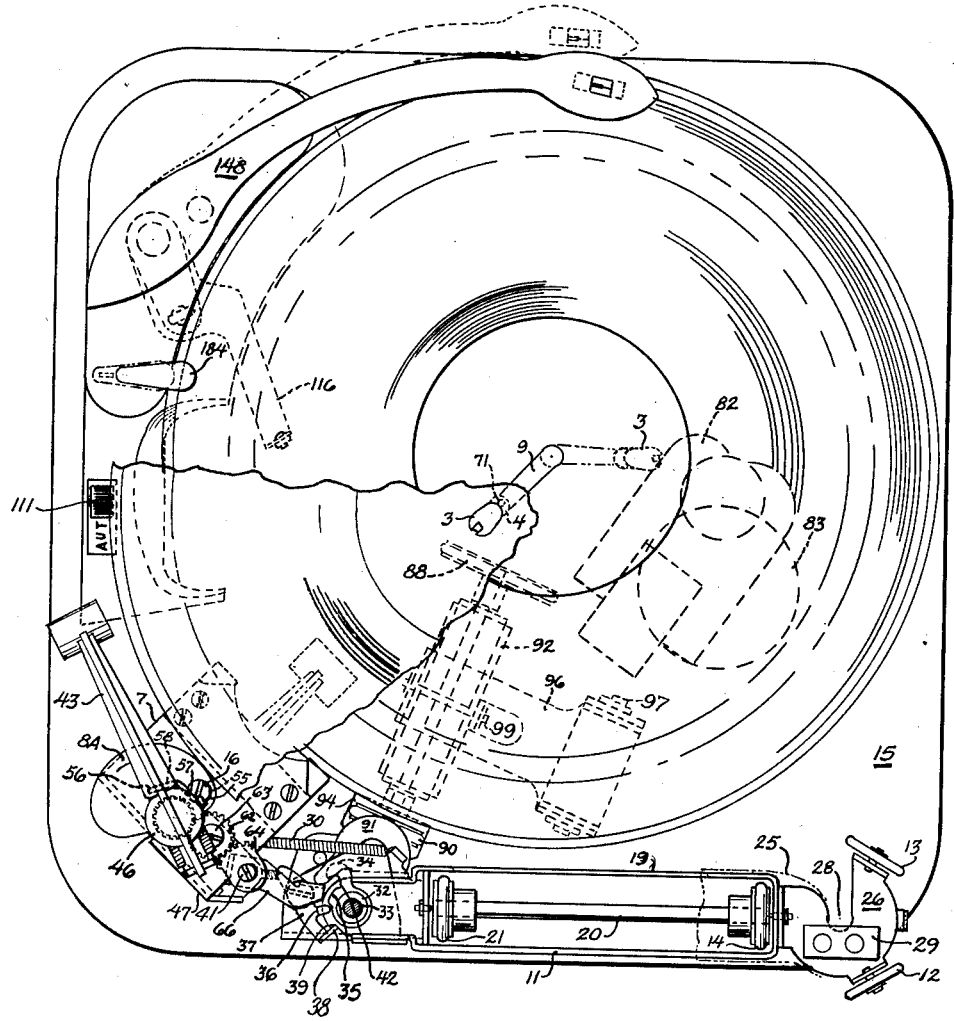

Dec. 23, 1952　　　R. A. MULLANEY ET AL　　　2,622,885
RECORD CHANGING APPARATUS
Filed Feb. 21, 1946　　　　　　　　　　　6 Sheets-Sheet 3

RALPH A. MULLANEY
KURT EMDE
HERBERT H. STEGLICH
INVENTORS.

BY
THEIR ATTORNEYS

Dec. 23, 1952
R. A. MULLANEY ET AL
2,622,885
RECORD CHANGING APPARATUS
Filed Feb. 21, 1946
6 Sheets-Sheet 4
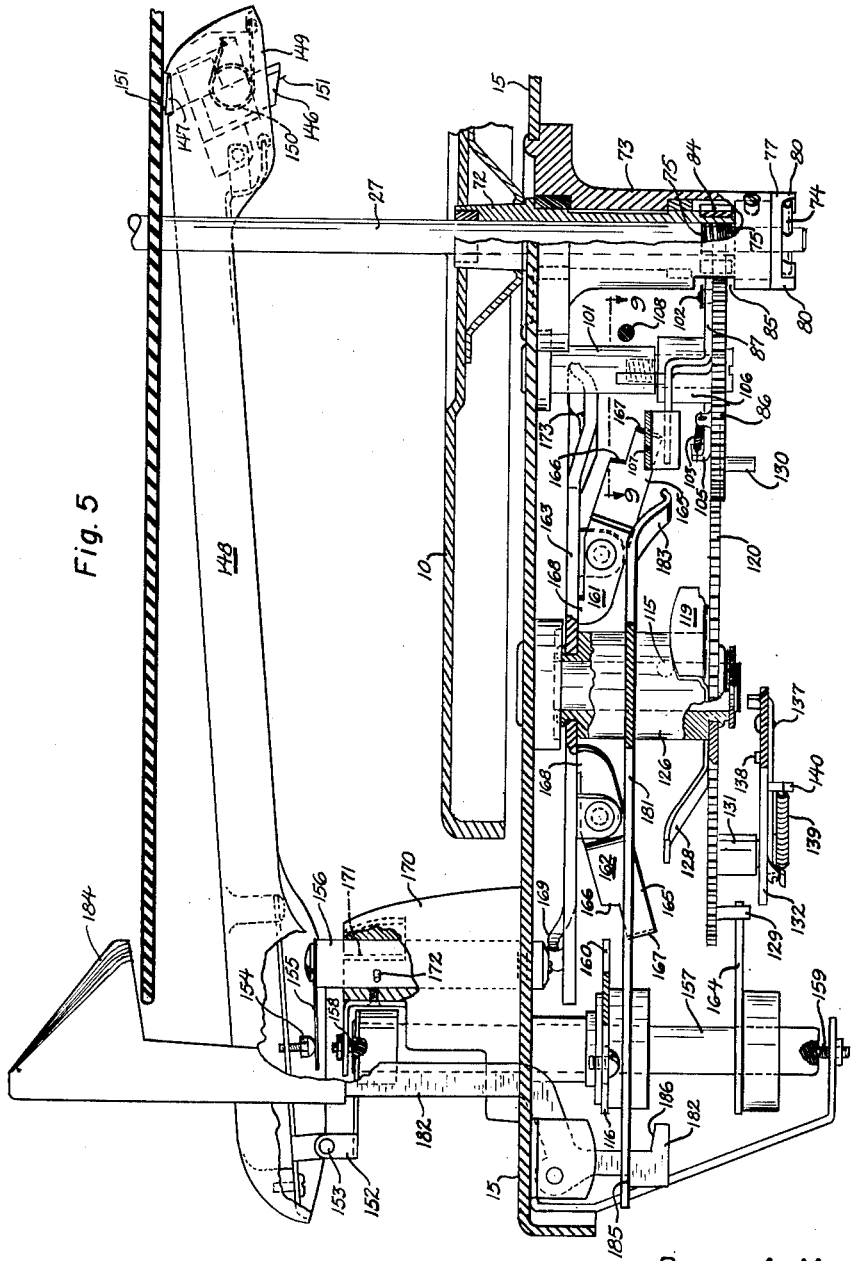
RALPH A. MULLANEY
KURT EMDE
HERBERT H. STEGLICH
INVENTORS
BY David M. Davis
Frank E. Mauritz
THEIR ATTORNEYS Dec. 23, 1952  R. A. MULLANEY ET AL  2,622,885
RECORD CHANGING APPARATUS
Filed Feb. 21, 1946  6 Sheets-Sheet 5
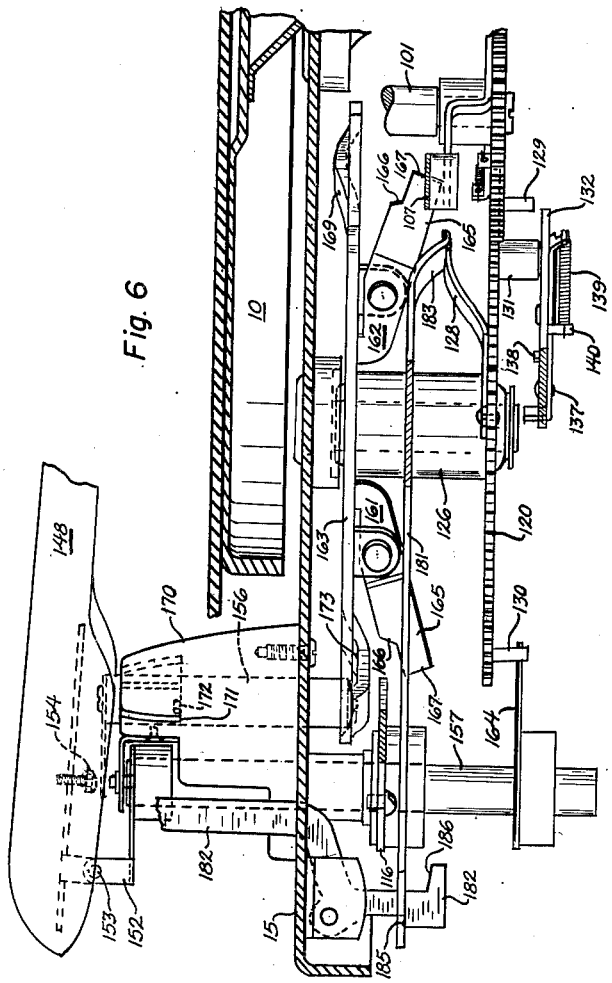
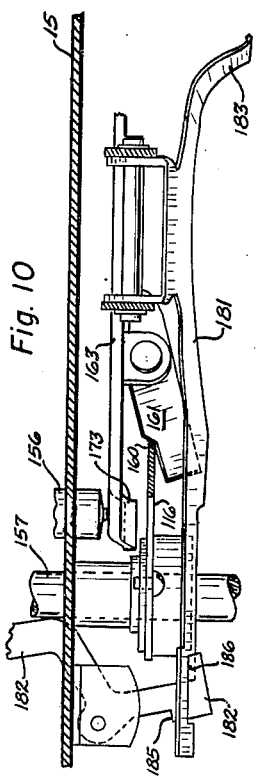
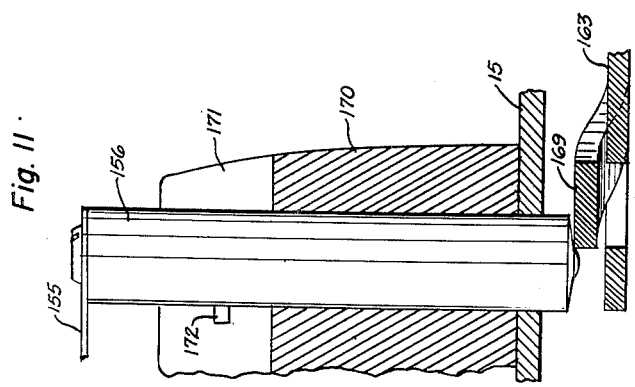
RALPH A. MULLANEY
KURT EMDE
HERBERT H. STEGLICH
INVENTORS
BY
THEIR ATTORNEYS Dec. 23, 1952   R. A. MULLANEY ET AL   2,622,885
RECORD CHANGING APPARATUS
Filed Feb. 21, 1946                    6 Sheets-Sheet 6

RALPH A. MULLANEY
KURT EMDE
HERBERT H. STEGLICH
        INVENTORS.
BY David M. Davis
   Frank L. Mauritz
THEIR ATTORNEYS Patented Dec. 23, 1952

2,622,885

UNITED STATES PATENT OFFICE 2,622,885

RECORD CHANGING APPARATUS

Ralph A. Mullaney, Elmwood Park, Kurt Emde, Itasca, and Herbert H. Steglich, Wilmette, Ill., assignors to Zenith Radio Corporation, a corporation of Illinois Application February 21, 1946, Serial No. 649,146

8 Claims. (Cl. 274—10)

1

The present invention relates to automatic record changers broadly and particularly to automatic record changers arranged to play either one or both sides of a record according to the wish of the operator.

The principal object of the present invention is to provide an improved fully automatic record playing and changing apparatus.

Another object of the present invention is to provide an improved automatic record playing and changing apparatus which will play a series of single face and/or successively play both sides of a series of double face records and/or one side of a series of double face records.

Another object of the present invention is to provide an improved automatic record playing and changing apparatus, adapted to play single and double face records, respectively, of different diameters, stacked in any order of size.

Another object of the present invention is to provide an improved compact inexpensive record changer for playing both sides of a record.

A still further object of the present invention is to provide an improved record changer of the type in which records are fed by gravity to a turntable and in which a record is rotated in an intermediate position between the record stack supporting means and turntable to allow playing of the underside of such record in its intermediate position.

Still another object of the present invention is to provide an improved automatic record playing and changing apparatus adapted to repeat the playing of one side of a record indefinitely.

Still another object of the present invention is to provide an automatic record playing and changing apparatus arranged so that the playing of any side of a record may be discontinued at will.

A further object of the present invention is to provide an improved automatic record playing and changing apparatus arranged so that the playing of the upper side of a double face record may be discontinued at will without interfering with the subsequent automatic playing of the underside of such record in a machine in which records are fed by gravity onto a turntable.

Another object of the present invention is to provide improved record playing and changing apparatus adapted to be used in a radio phonograph combination, that is to say, either in a direct circuit with a radio set or equipped with an oscillator unit cooperable with a radio set, or alone as a record playing and changing unit.

A further object of the present invention is to provide a simple fool proof, sturdy, compact and inexpensive mechanism in a record changer for playing both sides or one side as the case may be of a stack of indiscriminately arranged records of different diameters.

2

Another object of the present invention is to provide improved record changer apparatus so arranged that upon the completion of the playing of a stack of records, the tone arm is positioned so as to not replay any one of such records in the stack.

Figure 4:
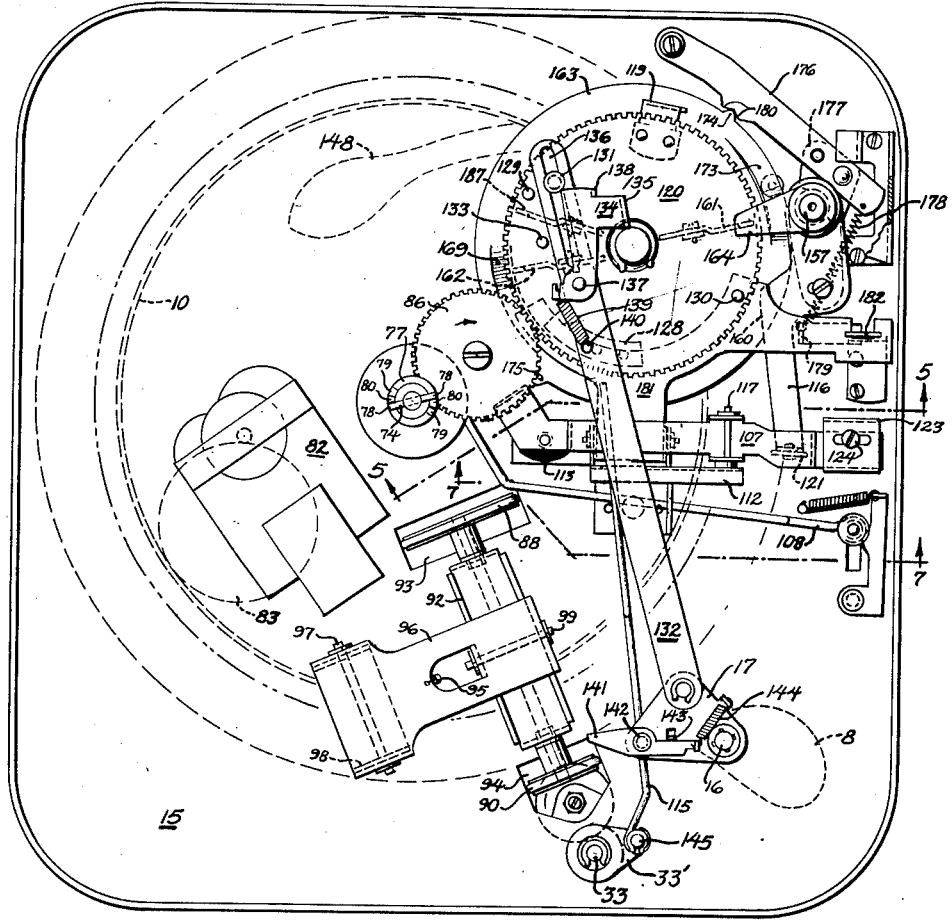
Figure 9:
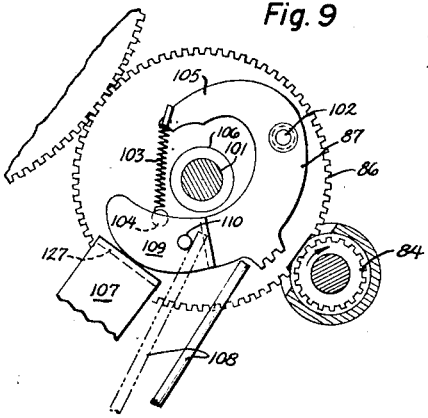
Figure 12:
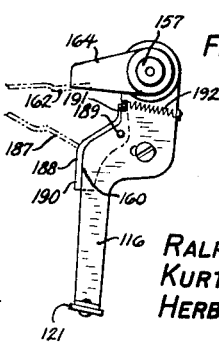
Figure 7:
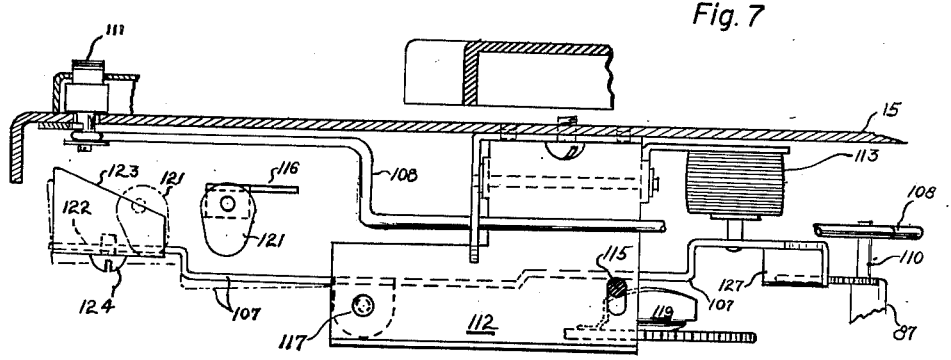
Figure 8:
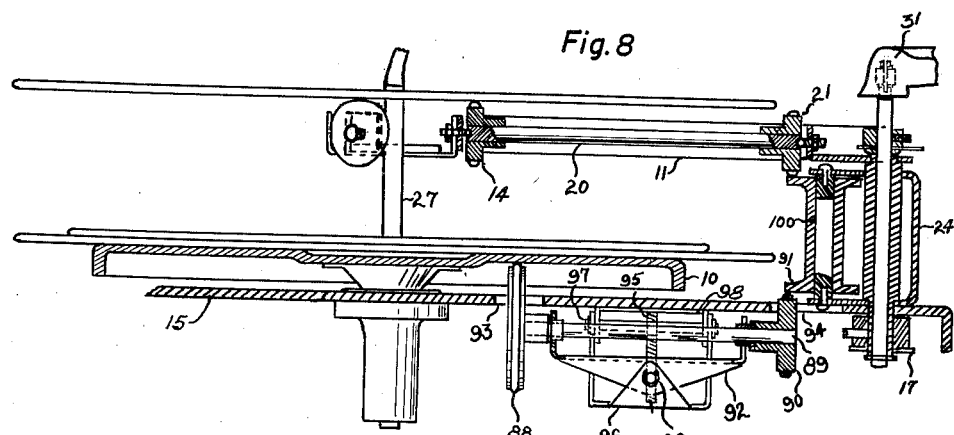
Figure 14:
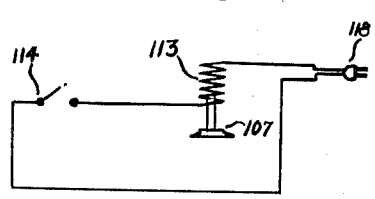

The features of the present invention which are believed to be novel are set forth with particularity in the appended claims. The present invention itself, both as to its organization and manner of operation, together with further objects and advantages thereof, may best be understood by reference to the following description taken in connection with the accompanying drawings in which:

Figure 1 is a plan view of a record changing and playing apparatus incorporating the present invention, a record being shown in an intermediate position supported for rotation on the movable boom structure 11 for playing the underside of such record, Figure 2 is a view in side elevation of a portion of the apparatus shown in Figure 1, Figure 3 is a plan view of the apparatus shown in Figure 1 but with the boom structure 11 latched in its retracted position to thereby provide single sided record playing and with the record clamping arm 43 moved to its retracted position, Figure 4 is a plan view of the underside of the apparatus shown in Figure 1 but with parts in their relative positions when the topside of a record is being played on the turntable 10, Figure 5 is a sectional view partly in elevation taken substantially on the line 5—5 of Figure 4, but with the corresponding parts of their relative positions when the underside of a record is being played, Figure 6 is a sectional view showing some of the parts of Figure 5 on a line corresponding to line 5—5 of Figure 4 but with the parts in their relative positions when as in Figure 4 a record is being played on the turntable 10, Figure 7 is a sectional view taken substantially on line 7—7 of Figure 4 but with the cam 119 of Figure 4 rotated 180° from the position shown therein, Figure 8 is a sectional view taken substantially on the line 8—8 of Figure 1 of some of the elements of the apparatus of Figure 1, Figure 9 is a sectional view taken substantially on the line 9—9 of Figure 5, Figure 10 is a sectional view corresponding substantially to the sectional view shown in Figure 6 but with some of the corresponding parts in their relative positions when the tone arm is being adjusted at its correct radial distance for playing a twelve inch record, Figure 11 is a detailed sectional view of a portion of the tone arm lifting mechanism, Figure 12 is a detailed view in elevation of a portion of the mechanism for adjusting the position of the tone arm when the underside of a record is being played, Figure 13 is a detailed view of the upper portion of the record supporting spindle 3 shown in Figure 1, and Figure 14 is a schematic circuit diagram of mechanism for effecting a so-called reject operation.

Briefly, the invention concerns itself with an automatic record playing and changing mechanism in which records in turn are allowed to gravitate from a storage magazine to a turntable where the upper sides of such records may be played after initially being arrested and rotated in an intermediate position wherein the underside of such records may be played. Thus, both sides of a record may be played or at the option of the operator the record changer apparatus may be adjusted for single side record playing by retracting the means which hold the record in the intermediate position mentioned. Also, the apparatus may be adjusted for so-called manual operation.

Records of 10" and 12" diameters are fed by gravity from a stacked position above the turntable to the turntable by a structure similar in many respects to the structure shown and claimed in the copending application of Kurt Emde and Ralph Mullaney, S. N. 639,037 filed January 4, 1946. That is, as shown in Figs. 1 and 2, a stack of mixed 10" and 12" records are threaded on the upper end 1, 2 of an offset spindle having the general reference character 3. The periphery of the center hole of the bottommost record rests on the spindle shoulder 4 and the outer periphery of the bottommost record rests upon the resilient elevated pads 5, 6 mounted on the stationary shelf 7 from where such bottommost record is allowed to slide by gravity down spindle 3 after being shoved off of such pads 5, 6 by the oscillatory pusher plate 8 which is oscillated during the record changing cycle by means described later.

After the bottommost record is moved from its supporting position on spindle shoulder 4 by movement of pusher plate 8 it slides by gravity down the curved portion 9 of the spindle either onto a conventional type of turntable 10 where its upper side is exposed for playing or onto a retractible boom structure 11 where its under side is exposed for playing. Such boom structure 11 carries at its free end two rotatable record engaging rollers 12, 13 of Bakelite material and a driven record engaging roller 14 of relatively soft material for supporting and driving a record in an intermediate position between its stacked position on pads 5, 6 and its ultimate position on turntable 10. The roller 14 is driven by means described later and the boom structure 11 upon which it is rotatably mounted may be retracted in a manner described later to allow single side record playing on the turntable 10 alone.

The boom structure 11 may be retracted manually to a permanent position wherein it does not arrest the movement of a falling record when the apparatus is adjusted for single side playing or it may be retracted automatically after the underside of a record is played to allow the upper side to be played on the turntable 10 when the apparatus is adjusted for playing both sides of a record.

The shelf 7 comprises a U-shaped frame member having one leg portion fastened to base plate 15 and the pads 5, 6 are mounted on the upper surface of the other leg portion of the U.

Pusher plate 8 having a raised portion 8A integrally formed thereon for suitable engagement with a 12" record is oval in structure and is arranged to slide on the upper portion of the U-shaped shelf frame by oscillatory movement imparted thereto by the pusher plate shaft 16 which is fastened at one of its ends to an end of the oval shaped pusher plate. The shaft 16 is journalled in the two spaced leg portions of the U-shaped shelf member 7 and is inclined at a small angle of about 4 degrees with respect to the vertical. The other end of the pusher plate shaft 16 extends below the base plate 15 and has mounted thereon a driving lever plate 17 (Fig. 4) for imparting an oscillatory movement to the pusher plate. The permissible oscillatory movement of plate 17 is limited by the pair of spaced stop pins 18 mounted on the upper portion of the U-shaped shelf member in the path of movement of the pusher plate 8.

The retractible boom structure 11 is formed in part of an elongated boxed frame member 19 in opposite ends of which is journalled a driving shaft 20 having mounted on each end thereof resilient rollers 14, 21. One end of such boxed frame member 19 is attached to a channel member 22 which in turn is fastened to a vertically rotatable shaft 23 journalled in the spaced legs of U-shaped bracket 24 which is fastened to base plate 15. As shown in Fig. 3 the driving roller 14 extends upwardly through an opening in the decorative boom structure housing 25 for driving engagement with a record while the two rotatable record supporting rollers 12, 13 having harder material on the periphery thereof than the peripheral material of roller 14 are mounted for rotation on the frame member 26 fastened to the free end of the boxed frame member 19. The three rollers 12, 13, 14 are so mounted that when boom 11 is in the position indicated in Figs. 1 and 2 their axes of rotation intersect substantially at a common point corresponding to a point on the axis of the vertical downward portion 27 of spindle 3. The frame member 26 has a reentrant portion 28 within which the straight downward spindle portion 27 may enter to allow coincidence of the point of intersection of the axes of rotation of rollers 12, 13, 14 with a point on the axis of the spindle portion 27. A resilient pad 29 is affixed to project within such reentrant portion 28 to take up shock forces when the boom structure 11 is swung into position in engagement with the straight downwardly extending spindle portion 27 under the influence of tension spring 30 which has one of its ends fastened to the channel member 22 of the boom structure and its other end fastened to the U-shaped shelf member 7 thereby to normally bias the boom structure 11 toward the spindle 3.

The boom structure 11 may be latched manually out of the path of ejected records by a latch mechanism described presently. One important feature of this latch mechanism is that the boom structure may be latched out of its normal spring biased position against spindle 3 only by manipulating the manual control knob 31 shown in Fig. 2; otherwise the boom structure 11 might become latched when it is not intended to become latched, for example, when the boom structure is moved by the record changer mechanism when the changer is conditioned for playing both sides of a record.

The latching control knob 31 is fastened to a shaft 33 sleeved and journalled within the vertical shaft 23. The bushing 32, secured to shaft 33, has integrally formed therewith a finger 34 arranged to engage and move the boom structure 11 outwardly against the force of tension spring 30 when control 31 is rotated in one direction. When the control 31 is rotated in the opposite direction, an integrally formed cam 35 on bushing 32 is effective to engage the projection 36 on latch member 37 to move it out of latched position, shown in Fig. 3, wherein the latch member projection 38 is held biased behind the toothed projection 39 on the boom structure 11, by the action of tension spring 40. The latch member 37 is pivotally mounted on the U-shaped bracket 24 by means of shoulder rivet 41 and one end of the tension spring 40 is fastened to an appropriate end of latch member 37 with the other end thereof fastened to the shelf bracket 7 thereby to bias the latch projection in the direction of the boom projection 39. When the boom structure is in its normal position against the spindle 3 or when the boom structure 11 is being moved by the changer mechanism described later the latch projection 36 is biased within the slight reentrant portion 42 between the finger 34 and cam 35 on the bushing thereby preventing engagement between the latch projection 38 and boom projection 39. Consequently, movement of the control knob 31 is necessary to produce relative movement between the independently movable bushing 32 and the latch 37 to allow latching of the boom structure in its position out of the path of a freely falling record.

The boom structure 11 is also moved to its retracted position upon movement of the spring biased record clamping arm 43 of substantially the same structure shown and claimed in the above mentioned copending application of Kurt Emde and Ralph Mullaney.

The rotatable spring biased arm 43 serves to maintain stacked records in suitable position on the shelf pads 5, 6 for displacement therefrom by the pusher plate 8. For this purpose, the spring biased arm 43 having a rubber record engaging surface 44 is pivotally mounted by means of pin 45 having its opposite ends fixedly mounted in opposite walls of a U-shaped guide bearing member 46. Member 46 is pivotally mounted at the lower end thereof on stationary frame member 47 by utilizing the bottom surface of member 46 as a bearing surface and by passing a screw or rivet 48 having an enlarged head upwardly through an opening in frame member 47 into a suitable holding recess in member 46. The stationary frame member 47, fastened to shelf bracket 7, provides an opening through which pusher plate 8 may revolve and is fastened by means of screws or the like to the record supporting shelf 7.

The free end of arm 43 is biased downwardly in all positions thereof by a pair of tension springs 49, 50, each of which has one end thereof looped over a common pin 51 stationarily mounted in the rearward extension 52 of arm 43. The other ends of springs 49, 50 are looped respectively over different pins 53, 54 stationarily mounted in oppositely disposed portions of U-shaped member 46.

The stationary frame member 47 has extending upwardly therefrom a pair of separated stop members 55, 56 which form an elongated slot 57 (Fig. 3) in which a guide extension 58 is confined when arm 43 is positioned to bear on the record. After all of the records initially stacked on offset shoulder 4 are dropped therefrom onto the turntable 10 or the boom structure 11, as the case may be, rivet 59 held in opposite walls of bearing member 46 and passing through an arcuate slot 60 in arm 43, limits downward movement of arm 43 by engaging one end of slot 60. In similar fashion rivet 59 engages the opposite end of slot 60 to limit upward manual movement of arm 43 against the action of tension springs 49, 50.

In order to move arm 43 out of the path of movement of records which are to be removed either from offset shoulder 4 or from the turntable 10 arm 43 is pivoted upwardly and then rotated counter-clockwise (Figure 3) to a position wherein an elevated projection of the stop 56 limits further rotational movement of arm 43. In order to return the arm 43 from its retracted position to its normal record engaging position, it is necessary only to rotate arm 43 clockwise to a point where arm extension 58 engages the stop member 55, whereupon the tension exerted by springs 49, 50 automatically causes the arm extension 58 to enter its normal position in the slot 57. With reference now to Fig. 1, the rotatable record stack holding arm 43 has formed thereon at its base a gear wheel 61 which meshes with the gear 62 rotatably mounted on the upper face of bracket 47 by means of a shoulder screw 63, the gear 62 in turn being in meshing engagement with the gear 64 attached on one end of vertical shaft 65 (Fig. 2) which is journalled for rotation in spaced ears of bracket 47. The other end of shaft 65 has affixed thereon a finger 66 cooperatively associated with the boom structure projection 67 to thereby cause outward movement of the boom structure 11 away from the spindle 3 upon manual movement of the stack holding arm 43 from its position wherein it holds a stack of records in clamped position to its retracted position wherein loading of the record changer with records is facilitated. The tension spring 30 is of insufficient strength to move the record clamping arm 43 from the retracted position. When the arm 43 is moved manually from such position, the boom structure 11 returns to its normal position against spindle 3 unless, of course, it is held latched due to prior manual operation of the control knob 31.

Provision is made whereby 10″ and 12″ records may be played intermixedly. For this purpose, the spindle 3 has a portion 9 of reduced cross section inclined upwardly towards the shelf member 7 and has what may be termed a "gooseneck" appearance. The records are normally supported in stacked position above the turntable at an angle of approximately 5 to 6 degrees and preferably 5½ degrees with respect to the horizontal plane. A tilting of the stacked records upwardly from the supporting shelf 7 is desirable because, inter alia, the upper right edge of a stack of records is then practically at the same vertical height as the highest point on arm 43 with a result that the composite record changer with stacked records is of minimum height and may be placed in a relatively small space within, for example, a radio cabinet to form a part of the radio phonograph combination.

The upper portion 1, 2 of the spindle 3 may be of the type and structure shown and claimed in the above mentioned application of Kurt Emde and Ralph Mullaney. Preferably, however, the spindle structure shown in such copending application is modified. That is, as shown herein, the spindle member 1 is pivotally mounted on the cooperating spindle member 2 at its upper end on a pin 68. Spindle member 1 has affixed on its inner side a cantilever type of leaf spring 69, the free end of which is arranged to abut the stop pin 70 thereby to normally bias the free end of the spindle member 1 away from the opposite side of cooperating spindle member 2. In contrast to the structure shown in the above mentioned copending application of Kurt Emde and Ralph Mullaney the spring 69 does not extend beyond the free end of spindle member 1 but the spring terminates at a point within the hollow semi-circular portion of the spindle member 1 so that the spring member 69 is not exposed for engagement with a record which is being removed either from the turntable 10 or from the boom structure 11, as the case may be. In order, however, to suitably feed records of different diameters from the spindle shoulder 4 satisfactorily and without dropping more than one record at a time a friction member 71, for example, of soft rubber or the like is held in inserted position in the spindle 3 so as to project slightly upper beyond the upward surface of spindle shoulder 4 which is of metal. By thus providing this friction member 71 for engagement with the bottommost record of a stack of records no difficulty arises in feeding records of different diameters from the shoulder 4 onto the turntable or boom structure as the case may be. Without this particular friction means and in the absence of a spring projecting from the free end of spindle member 1 there is some likelihood that when a 10" record is stacked immediately above a 12" record the 10" record will be discharged from the spindle shoulder 4 simultaneously with the 12" record. Inasmuch as it appears undesirable to have a spring member projecting from the free end of the spindle member 1 in the path of records which are being removed from the turntable or the boom structure 11, as the case may be, it is preferred, as shown herein, not to expose the spring member 69 as shown in the copending application of Kurt Emde and Ralph Mullaney but instead to provide the friction member or pad 71 at the spindle shoulder 4.

The spindle 3 may be rotated about its axis from its normal position wherein it is arranged to support a stack of records to a second position approximately 135 degrees away from such normal position wherein in such second position the removal of records from the turntable or boom structure is facilitated. The normal record supporting position of spindle 3 is shown in full lines in Figure 3 and such second position of spindle 3 is shown in dotted lines in Figure 3. For this purpose, with reference to Fig. 5, spindle 3 is journalled for limited rotational movement in the hollow portion of the center turntable shaft 72 journalled for rotary movement in the downwardly extending sleeve 73 which in turn is fixedly mounted below and on the base plate 15. In order to assure predetermined positioning of spindle 3 in the two positions mentioned above the lower end of spindle 3 is arranged to cooperate with a combination stop and detent structure affixed on the lower end of sleeve member 73. That is, the horizontal pin 74 fastened through the lower end of spindle 3 is spring biased by means of compression spring 75 disposed between a shoulder 76 on spindle 3 and the circular stop and detent plate 77 into either one of the two pairs of detents 78, 79 (Fig. 4) in the bottom of such circular plate 77. Also, in order to limit rotational movement of the spindle 3, the circular plate 77 has extending downwardly therefrom a pair of integrally formed stop projections 80 which are arranged to cooperate with the horizontal pin in the lower end of spindle 3. It is noted that the particular structure described allows easy removal and assembly of the center spindle 3 since in order to remove spindle 3 it is necessary only to remove the horizontal pin 74 which preferably is a drift pin. Furthermore, the circular plate 77 also forms a bearing member for the lower end of spindle 3.

In order to facilitate the removal of records from either the turntable or the boom structure 11, as the case may be, the spindle 3 is rotated 135 degrees to the dotted position shown in Figure 3 and then records are lifted manually upwardly. Since the uppermost record engages the spindle member 1, it is automatically pivoted upwardly to form a prolongation of the cooperating spindle portion 2 and thus form a straight line path for the removal of records above the spindle shoulder 4. In order to limit the movement of the spindle portion 1 to a position wherein it does form a prolongation of spindle 2, the pivoted end of spindle portion 1 has a projection 81 (Fig. 13) formed thereon to cooperate with the stop pin stationarily mounted in the cooperating spindle portion 2.

The turntable 10 is driven in conventional manner by a driving motor 82 the shaft of which is arranged to frictionally engage the spring biased wheel 83 which in turn engages the rim of the turntable to drive the same. With reference now to Fig. 5, the turntable itself is press fit onto the upwardly extending turntable shaft 72 which as mentioned is journalled for rotation in the sleeve member 73 stationarily mounted on and below the base plate 15. A gear 84 affixed to shaft 72 is in registry with a window 85 in sleeve member 73 and is arranged for driving cooperation with a mutilated gear 86 and auxiliary gear part 87 thereof on the record changer mechanism proper as discussed in more detail later.

The driving motor 82 serves to drive the turntable 10 and also the mutilated gear 86 of the record changer proper. Also, as shown in Fig. 8, the driving motor 82 serves to impart rotary movement to the driving wheel 14 on the boom structure 11 by the mechanism described presently through the turntable 10 wheel 88, shaft 89, wheel 90, spool 91, wheel 21, shaft 20 and then to wheel 14.

For this purpose, the pair of rubber rimmed wheels 89, 90 journalled in frame member 92 are biased upwardly respectively through openings 93 and 94 in base 15 to engage respectively the motor driven turntable 10 and rotatable spool 91. This bias is provided by means of tension spring 95 having one end fastened to the base plate and the other end fastened to the free end of a pivotally mounted frame member 96 which in turn is pivotally mounted at the center of frame member 92. As shown in Figs. 3 and 8, frame member 96 is pivotally mounted on pin 97 which is journalled in spaced ears of bracket 98 mounted on the bottom of the base plate 15. The free end of frame member 96 is pivotally attached to the center of frame member 92 by means of a pin 99 passing through spaced ears of frame member 96 and frame member 92 to thereby provide an inexpensive self-aligning structure for maintaining automatically a good driving connection between the turntable 10 and spool 91, both of which rotate about vertical axes. That is, the structure described, since it allows automatic movement of the rollers 88 and 90 either together or singly into automatic aligned position by virtue of the fact that the axes of pivot pins 97 and 99 are disposed substantially 90 degrees with respect to one another, assures good driving connection between the turntable 10 and spool 91 even though parts manufactured in accordance with present day mass production methods become worn in extended use.

The spool 91 is journalled for rotational movement on the vertical shaft 100 having its ends secured in spaced ears of the bracket 24 secured on the base plate 15. The distance between the ears of bracket 24 exceeds the length of spool 91 so as to allow slight vertical movement of the spool to assure good driving connection not only between the metal spool 91 and the rubber rimmed driving wheel 80 but also between the metal spool 91 and the rubber rimmed driven wheel 21 journalled on the boom structure 11. That is, spool 91 is provided with a slight amount of end play to assure the transmission of forces developed by tension spring 95 from the spool 91 to the driven wheel 21 to thereby assure a good driving connection therebetween.

The driving connection between metal spool 91 and boom wheel 21 exists only so long as the boom structure 11 is in position against spindle 3 for playing both sides of a record, as seen in Fig. 3, spool 91 and boom wheel 21 are out of engagement when the boom structure is in its retracted position. It is thus evident that the end play provided in spool 91 allows also breaking and remaking of a good driving connection between the spool 91 and boom wheel 21.

It is thus apparent from the structure thus far described that the spool 91 rotates anytime the turntable 10 rotates but the record driving wheel 14 on the boom structure is rotated only when the boom structure 11 is in position against the spindle 3 and, of course, when the turntable is being rotated.

The mutilated gear 86, shown in Fig. 9, is rotatably mounted on the free end of the base plate pin 101 and serves to impart movement to the record changer apparatus from the energy in the continuously movable gear 84 affixed at the bottom of the continuously rotating turntable shaft 72. A record changing cycle is initiated upon allowing the spring biased supplementary gear portion 87 mounted on the mutilated gear to engage with the turntable gear 84. That is, during the record playing cycle the mutilated portion of the mutilated gear is directly opposite the continuously rotating turntable shaft gear 84 and the mutilated gear does not rotate until the spring biased supplementary gear portion 87 is allowed to move into registry with the continuously rotating turntable gear 84. This supplementary gear portion 87 is pivotally mounted on the mutilated gear 86 by means of the shoulder rivet 102 and is biased in a direction to fill in the mutilated region of the mutilated gear 86 by means of a tension spring 103 having one of its ends attached to a pin 104 on the mutilated gear and its other end attached to an extension 105 of the supplementary gear portion 87. The extension 105 is curved to cooperate with the mutilated gear hub 106 to provide a stop whereby the teeth on supplementary gear portion 87 which are identical with those of the mutilated gear 86 are held in operative position by spring pressure in registry with and on the same circumference defined by the teeth on the mutilated gear 86. This supplementary gear portion 87 is essential for initiating a record changing cycle and may be held out of such operative position by one of two means, namely, either the automatically operated record changing lever 107 or the manually operated record changing lever 108. The automatically operated lever 107 is intended to engage the supplementary gear extension 109 to thereby block movement of the supplementary gear portion to operative position while for the same purpose the pivoted manually operated lever 108 engages the pin 110 carried on the extension 109.

With reference to Fig. 7, in order to adjust the record changer for either so-called manual or automatic playing of records the manual control knob 111 is moved to either one of its two corresponding positions. This control knob is attached to one end of lever 108, whose function is described above, to produce the desired positioning of such lever 108. The lever 108 is fulcrumed at a point substantially midway between its ends on base plate bracket 112 through which it passes. In one position of the control knob 111 corresponding to "Manual" position the free end of lever 108 maintains the supplementary gear portion 87 out of its normal position to thereby prevent the initiation of a record changing cycle. In the other position of the control knob corresponding to "Automatic" position the free end of lever 108 does not interfere with the movement of the supplementary gear portion 87 and it is allowed to enter into registry with the gear teeth on the mutilated gear 86 under the influence of its biasing spring 103 to thereby be in position for initiating an automatic record changing cycle by the means described later.

The other lever 107 which also controls the position of the supplemental gear portion 87 for initiating a record changing cycle is operated either (1) by a solenoid 113 energized through the reject electrical switch 114 of Fig 14, (2) by the rod 115 attached to the boom structure 11 or (3) by the tone arm extension 116.

The lever 107 is pivotally mounted on the pin 117 secured on the base plate bracket 112 in such a manner that the end adjacent the supplementary gear portion 87 is gravity biased in a normal downward position where it is effective to block movement of the supplementary gear portion 87. Thus, lever 107 normally maintains the record changing mechanism inoperative.

The lever 107 may be moved from its normal gravity controlled position by energizing the solenoid 113 mounted on the base plate 15 thereby to magnetically attract upwardly that end of lever 107 adjacent the supplemental gear portion 87. Such displacement of lever 107 allows movement of the gear portion and initiation of a record changing cycle. Solenoid 113 is connected in a series circuit with the source plug 118 and the reject switch 114 and is of course energized by closing such reject switch 114 which may be situated at some convenient place, for example, on the control panel of a radio phonograph combination.

Also, as shown in Figs. 4 and 7, lever 107 may be moved by movement imparted to the rod 115 attached to the boom structure 11. Such movement may be imparted to rod 115 in either one of two ways such as by moving the boom structure 11 to retracted position (corresponding to one sided record playing) to position the straight or free end portion of rod 115 in the path of movement of the cooperating rotatable cam structure 119 which engages rod 115 and displaces this rod together with lever 107 vertically to allow initiation of a record changing cycle and incidentally to cause one revolution of the one-half revolution gear 120 in a manner described in more detail later. Alternatively, movement may be imparted to rod 115 by moving the boom structure manually when a record is resting thereon thereby automatically initiating a record changing cycle to "clear" the machine in case the record initially supported by such boom structure falls on the tone arm.

Also, as seen in Fig. 7, the gravity biased lever 107 may be moved into position corresponding to record changing position by the tone arm extension 116 carrying on the free end thereof a pivotally mounted egg shaped rubber clutch member 121 arranged to cooperate with the smooth surfaced portion 122 of lever 107. The lever 107 is displaced in response to outward movement of the tone arm, for example, when the tone arm stylus travels in the oscillatory end groove of a record. That is, the rubber clutch member 121 and lever portion 122 form a one-way clutch with member 121 sliding over surface 122 during inward travel of the tone arm while member 121 becomes wedged between elements 107 and 116 causing coupling engagement between the two parts when the tone arm is moved outwardly after travelling a slight distance inwardly on a record. Also, it is noted that there is attached to the end of lever 107 a structure having an inclined edge 123 in the path of movement of the tone arm extension 116 to cause sufficient movement of the lever 107 to initiate a record changing cycle when the tone arm has moved inwardly a distance too close to the centering spindle 3. That is, the lever 107 is moved to allow initiation of a record changing cycle either (1) when the tone arm stylus travels in the end oscillatory groove of a record or (2) when the tone arm moves inwardly a predetermined distance determined by the position of the cam structure 123 which may be adjusted in position by set screw 124 on lever 107.

The one-revolution mutilated gear 86, as shown in Fig. 4, meshes with the one-half revolution gear 120 which is mounted on the bushing 126 rotatably mounted on the base plate 15. Inasmuch as the ratio of the diameter of the mutilated gear 86 to the diameter of the gear 120 is in the ratio of 1 to 2 and since but three teeth of the gear 86 (Fig. 9) are missing, the driving connection between the gears 86 and 120 during one complete revolution of the driving mutilated gear 86 is continuous. During a record changing cycle the mutilated gear makes but one revolution when the machine is adjusted to play both sides of a record inasmuch as the end 127 of lever 107 blocks the supplementary portion 87 away from the turntable shaft gear 84 after one complete revolution. When the machine is adjusted for playing but one side of a record by moving the boom structure 11 to retracted position the lever 107 is tripped by resulting movement of the rod 115 as described above and a second record changing cycle is initiated with the result that when the machine is adjusted for single side record playing the mutilated gear 86 automatically makes two revolutions and the gear 120 makes one revolution for each record.

The one-half revolution gear 120 has mounted thereon, in addition to the cam structure 119 mentioned previously for automatically initiating a second revolution of the mutilated gear 86, a cam track 128 for actuating a portion of the record diameter meter or record discriminator mechanism described later, a pair of diametrically opposite pins 129 and 130 for swinging the tone arm outwardly during the record changing cycle, a crank pin 131 for imparting motion to automatically adjusted link 132, and a pin 133 for actuating a member 134 forming a part of such link 132. It is noted that the cam structure 119 and cam track 128 are disposed on the same or upper side of gear wheel 120, substantially diametrically opposed and the diameter joining them is substantially perpendicular to the diameter joining the two pins 129 and 130 on the other side of the gear wheel 120.

The link 132 connected between crank pin 131 and the lever plate 17 imparts to the connected pusher plate shaft 16 an oscillatory movement through an angle of approximately 110 degrees, the pusher plate shaft moving approximately 110 degrees in one direction during one-half of one revolution of gear 120 and approximately 110 degrees in the opposite direction during the succeeding one-half of one revolution of gear 120.

It is important to note that the connected pusher plate 8 shoves the bottommost record of a stack off the spindle shoulder 4 only once per complete cycle of the pusher plate shaft 16 or in other words upon one complete revolution of the one-half revolution gear 120.

The connecting link 132 extending from the crank pin 131 on the gear 120 to the lever plate 17 has a lost motion slot 136 in which the crank pin 131 is allowed to slide. The effective length of slot 136 is automatically adjusted during the record changing cycle by means of the spring biased closure plate 134 and the cooperating pin 133 mounted on the gear 120 so as to produce the desired oscillatory movement of pusher plate shaft 16. The closure plate 134 is pivotally mounted on the link 132 by means of pin 137 and has its stop projection 138 normally pressed into engagement with the body portion of the link by means of tension spring 139 having one end thereof hooked around a pin 140 on the link 132 and its other end hooked around a spring terminal on member 134. In the normal position of plate 134, represented in Fig. 4, the length of slot 136 is restricted considerably to thus provide only a relatively limited lost motion connection between the pin 131 and the link 132. But, during a portion of the cycle of revolution of the gear 120 the closure plate extension 135 is engaged by the pin 133 and the closure plate 134 is then moved out of its normal position to uncover and effectively lengthen the lost motion slot 136 thereby to provide a relatively greater amount of lost motion between the crank pin 131 and the link 132. In that portion of the revolution of gear 120 in which the closure plate 134 is in its normal spring biased position it serves as an abutment for the crank pin 131 to impart thrust forces to the link 132

In addition to imparting movement to the pusher plate shaft 16 the link 132 serves also to impart movement to the one-way spring biased clutch element 141 which is instrumental in moving the boom structure away from its normal spring biased position against the spindle 3 thereby to allow a record initially supported thereon to drop onto the turntable. For this purpose, the one-way clutch element 141 is pivotally mounted for one-way movement on lever plate 17 by means of shoulder screw 142 and is pressed into engagement with the lever plate projection 143 by means of tension spring 144 having one of its ends attached to the lever plate 17 and its other end attached to the end of the clutch member 141. The other end of member 141 is arranged to be swung into engagement with the crank pin 145 mounted at the end of the boom shaft 33 on the lever plate 33'.

The one way clutch member 141 is mounted on the pusher plate shaft 16 which as mentioned previously oscillates through an arc of approximately 110 degrees. The boom crank pin 145 in its normal position, when the machine is adjusted for playing both sides of a record, is disposed substantially midway within the 110 degree arc defined by movement of the one way clutch element 141. During one half revolution of gear 120 the one way clutch element 141 is swung in one direction and in the succeeding one half revolution of gear 120 the one way clutch element is swung in the other direction. The one way clutch element 141 conjointly engages elements 143, 145 and moves the boom structure 11 outwardly in one of its movements and merely brushes past the boom pin 145 in moving in the opposite direction. Hence, it is evident that the boom structure 11 is initially deflected outwardly and allowed to return under the influence of tension spring 30 once per two revolutions of mutilated gear 86 but once per complete revolution of gear 120.

The tone arm and pickup shown and described herein is of the type shown and claimed in the copending application of Henry P. Kalmus, Serial Number 585,826, filed March 31, 1945, adapted to play the top or bottom side of a record. That is, as shown in Fig. 5, two pickup cartridges 146 and 147 are mounted on the free end of the tone arm 148 and arranged to play respectively the top of a record on turntable 10 and the underside of a record when it is being rotated on the boom structure. Both of these cartridges are connected electrically in series in the same electrical circuit of the type shown in the above mentioned application of Kalmus so that either one of the cartridges 146 and 147 may "play" a record without the necessity of electrical switching.

The particular tone arm used bears on either side of the record played with a minimum force and the lower cartridge 146 may be deflected upwardly out of harm's way into the protective housing 149 of the tone arm whenever a large force is exerted thereon as described in such copending application of Henry P. Kalmus, for example, when in unusual circumstances a record is dropped on the tone arm after the boom structure is manually moved from its normal record supporting position to allow a record to fall onto the turntable.

The cartridges 146 and 147 are maintained in desired spring biased position by spring 150 and although the cartridges are relatively free to move upwardly out of harm's way when for example, the tone arm is dropped with more than usual force onto a record on the turntable, the downward movement of the cartridge 147 is limited to a relatively small distance so that the corresponding stylus needle 151 may be held upwardly against a record revolving on the boom structure. A particular feature of the present record changer described is that it allows the use of low mass pickups and tone arms which bear against a record with relatively small force.

The tone arm 148 is hinged about a horizontal axis on the upper end of the rotatable tone arm bracket 152 at the point 153 and carries an abutment 154 on its underside arranged to cooperate with the free end of a cantilever leaf spring 155 mounted on the vertically movable tone arm raising and holding pin 156 for the purpose of providing a tone arm movable in both the vertical and horizontal planes.

The tone arm supporting bracket 152 is fastened to the shaft 157 which is journaled for rotation about a vertical axis preferably in an antifriction bearing such as that achieved by the use of jewel bearings 158 and 159 at the ends of shaft 157 to allow ease of movement of the tone arm in a horizontal plane. The tone arm vertical shaft 157 has affixed thereon below the base plate 15 and intermediate its ends the cam member 116 carrying the one way clutch member 121 described previously. The cam member 116 has the cam surface 160 arranged to be engaged by gravity positioned dog members 161 and 162 (described later) to swing the tone arm inwardly and automatically adjust the starting position of the tone arm on a 10" or 12" record, as the case may be. Also, affixed to the tone arm vertical shaft 157, is finger 164 arranged to cooperate with two diametrically opposed pins 129 and 130 on the one-half revolution gear 120 to move the tone arm outwardly in the horizontal plane during the initial phase of a record changing cycle.

The gravity actuated dog members 161 and 162 for adjusting the starting position of the tone arm on a 10" or 12" record are pivotally mounted at diametrically opposite positions on the one-half revolution disc 163 which is affixed on the rotatable bushing 126. Each of these dog members 161 and 162 is pivotally mounted on respective ears formed from the disc 163 itself and each has an elongated end 165 having thereon the surfaces 166 and 167 at different radial distances from the center of rotation of bushing 126. The ends 165 are normally held downward by gravity and the other ends 168 of the dog members form stops to limit pivoted movement.

Also, the rotatable disc 163 has an upstanding arcuate-shaped cam surface 169 formed thereon to engage and move upwardly the tone arm lifting rod 156 (Fig. 11) which is arranged to slide in the vertical bushing 170 fastened to the base plate 15. The bushing 170 has a slot 171 therein arranged to cooperate with the guide pin 172 on the rod 156 to maintain the cantilever spring 155 in oriented position with respect to the abutment 154 on the tone arm. It is thus evident that the cam surface 169 on the disc 163 causes the tone arm to be raised to a position where it may play the underside of a record rotating on the boom structure 11, in which case the cantilever spring 155 biases the tone arm upwardly and presses the stylus of cartridge 147 lightly against the underside of the record.

Also, the rotatable disc 163 is provided with a downwardly recessed cam surface 173 diametrically opposed to the elevated cam surface 169 to allow the tone arm lifting pin 156 to fall by gravity into the recessed cam portion 173 thereby to permit the stylus of the lower cartridge to fall onto and engage the upper surface of a record rotating on the turntable 10.

As may be seen in Fig. 4, the disc 163 has a pair of diametrically opposed projections 174 and 175 on the periphery of the disc for releasing the tone arm brake member 176 during the record playing cycle. The spring biased brake lever member 176 has one end thereof pivotally mounted on the underside of the base plate and its other end has affixed thereto a brake shoe 177 which is arranged to be pressed into braking engagement with the tone arm shaft 157 by the tension spring 178 having one of its ends fastened to the lever member 176 and its other end fastened to the base plate ear 179. The brake lever member 176 has a projecting portion with a detent 180 therein for engagement with the disc projections 174 and 175, the projections 174 and 175 serving to move the brake lever member 176 away from the tone arm shaft 157 to release the brake and allow freedom of tone arm movement and concurrently to lock the disc 163 against rotation.

With reference to Fig. 5, the dog members 161 and 162 are automatically positioned during a record changing cycle to adjust the tone arm position at the starting groove of a 10" or 12" record as the case may be. Normally these dog members 161 and 162 are subject to be held against the action of gravity by the plate 181 in a position where the dog ends 167 may engage the cam surface 160 on the tone arm extension 116 to adjust the tone arm starting position for a 10" record, but these dog members 161 and 162 may be allowed to move downwardly by allowing the plate 181 to fall under the influence of gravity. The gravity actuated dog engaging plate 181 which is pivotally mounted on the base plate bracket 112 and which is normally held against gravity by the record discriminator lever 183 disposed has a downwardly curved extension 182 in the path of movement of the upper cam member 128 on the one-half revolution gear 120. Upon rotation of gear 120, cam 128 engages extension 183 to cause the dog plate 181 to be raised to a position where it may be automatically latched by the gravity operated record discriminator lever 182. Certain features of the record discriminator lever shown herein are shown also and claimed in the above mentioned copending application of Kurt Emde and Ralph Mullaney.

The record discriminator lever 182 has at its upper end a record engaging member 184 arranged to be engaged by only a 12" record when it falls in the region between the spindle shoulder 4 and the boom structure 11. The lever 182 is pivoted at a point intermediate its ends in such a manner that gravity forces acting thereon tend to rotate the record engaging member 184 towards the spindle 3 but such rotational movement is limited by engagement of the bottom end of lever 182 with the dog lifting plate 181. The bottom end of discriminator lever 182 is held in its normal position by engagement of the discriminator shoulder 185 with the undersurface of plate 181 thereby maintaining dog plate 181 and the dog members 161 and 162, as they engage the plate, in raised position for adjusting the starting position of the tone arm to play a 10" record. As may be seen in Fig. 10, when the discriminator lever 182 is moved by a falling record the shoulder 185 no longer engages the plate 181 and it is allowed to fall thus simultaneously allowing the dog members 161 and 162 to tilt. Descending movement of the plate 181 is limited due to engagement of the plate 181 with the lower discriminator lever projection 186. After the plate has been thus allowed to fall the plate 181 and discriminator lever 182 are restored to normal position upon rotation of the one-half revolution gear 120 which carries the plate repositioning cam 128 into engagement with the plate extension 183 thereby to raise the plate 181 to move it upwardly to a position wherein the discriminator shoulder 185 moves by gravity underneath the plate 181 to latch it in position. It is noted that this so-called "recocking" of the discriminator lever 182 and plate 181 occurs only once per revolution of the one-half revolution gear 120 or once per two revolutions of the multilated gear 86. This cyclic arrangement is of importance when the dog members 161 and 162 are allowed to fall into position for adjusting the tone arm for 12" records when a 12" record strikes the record discriminator 184 disposed in the path of a falling record between the spindle shoulder 4 and the boom structure 11. The dog members 161 and 162 remain in this adjusted position for playing a 12" record when subsequently the record is dropped from the boom structure 11 onto the turntable 19. Moreover, the record changer mechanism is so arranged that when a record is allowed to fall from the boom structure onto the turntable 19 there is no record moving from the spindle shoulder 4 to the boom structure so that in such case the record discriminator 184 is not moved.

The disc 163 also carries a third dog member 187 (Fig. 4) substantially identical in structure with the other two dog members 161 and 162 and on substantially the same circle of rotation, the third dog member 187 being displaced an angular distance of about 10 degrees from the dog member 162 and on the trailing side when the disc 163 is rotated during the record changing cycle. The function of this third dog member 187 in relation to the spring pressed plate 188 of Fig. 12 mounted on tone arm cam plate 116 is discussed immediately below.

When the tone arm is positioned for playing a record on the turntable 19 there is an inherent tendency for the tone arm to move inwardly in the direction toward the center spindle and no great difficulty is encountered in positioning or tracking the tone arm. However, when the tone arm is positioned for playing the underside of a record on the boom structure 11 there is an inherent tendency for the tone arm to move outwardly in the direction away from the center spindle 3 and tracking difficulties arise. In order to avoid such last mentioned difficulties, the third dog member 187 and associated spring biased plate 188 are provided to overcome the tendency of the tone arm to move outwardly.

The spring biased lever plate 188 is pivotally mounted by rivet 189 on the upper surface of tone arm cam plate 116 with one end 190 thereof extending beyond the cam plate projection 188 and with the other end 191 forming a stop member attached to one end of a tension spring 192 having its other end anchored on the tone arm extension plate 116. The spring biased lever plate 188 in its normal position extends a slight distance beyond the cam edge 160 of the cam extension plate 116 from where it may be pressed inwardly by any one of the three dog members 161, 162 and 187 thereby providing a resilient abutment on the tone arm extension plate 116 for engagement with such dog members 161, 162 and 187. The third dog member 187 is immediately adjacent the cam 160 on the tone arm extension plate during the time the underside of a record rotating on boom structure 11 is being played thereby providing a stop for objectionable outward movement of the tone arm. Before the third dog member 187 assumes its position wherein it serves as a stop for outward tone arm movement it strikes the spring biased plate 188 thereby imparting to the attached tone arm a reaction force for overcoming the inherent tendency of the tone arm to swing outwardly. This countering force continues after the tone arm is accurately positioned at the starting groove of the underside of the record supported on the boom structure and proper tracking is achieved.

Manual operation

The apparatus described herein may be conditioned for so-called "manual operation" by moving the control element 111 to the one of its two positions marked "manual" in which case the free end of the attached control rod 108 (Fig. 9) is moved to engage the supplementary gear pin 110 and move it and the supplementary gear portion 87 to a retracted position wherein it is ineffective to engage the continuously rotating turntable gear 84. Under these conditions, inasmuch as the mutilated part of the mutilated gear 86 is adjacent the turntable gear 84, there is no energy transfer between these two elements and the mutilated gear, as well as the other record changing apparatus driven by such gear 86 remains stationary when the apparatus is conditioned for manual operation.

When the manual control element 111 is moved to its other position labeled "Aut" the free end of the attached lever 108 is moved out of the path of movement of the mutilated gear pin 110. Neglecting momentarily the effect of lever 107, this movement of element 108 allows the mutilated gear to move to its normal spring biased condition filling in the mutilated portion of the mutilated gear 86 thus effectively rendering the mutilated gear 86 whole again. Under such conditions the mutliated gear and supplementary gear portion 87 are allowed to become operative to transfer rotary movement from the continuously rotating turntable gear to the record changer proper.

Mechanism for automatically initiating the record changing cycle

In order to initiate a record changing cycle the supplementary gear portion 87 must be allowed to move to its normal position in engagement with the turntable gear 84. The supplementary gear portion 87 is normally held out of engaging position with gear 84 by the pivoted tripping lever 107 which may be tripped either by the solenoid 113 forming a part of the reject mechanism, by movement of the tone arm 148 to an extreme position or in a backward direction, or by the rod 115 actuated upon movement of the boom structure 11.

Double-side record playing

The record changer apparatus is conditioned for double sided playing by allowing the boom structure 11 to return to its normal spring biased position against the center spindle 3. Initially, the spring biased pivoted record clamping arm 43 is rotated to the position indicated in Figure 3 to allow a stack of records to be supported at the center thereof on spindle shoulder 4 and at the periphery thereof on the pads 5 and 6. The boom structure 11 is moved out of its normal position to its retracted position simultaneously with manual movement of the record clamping arm 43 to its retracted position wherein it does not interfere with the loading of records on the machine. If desired, since the boom structure 11 is automatically retracted, under these circumstances a single record may be threaded onto the spindle 3 and placed on the turntable 10 either for manual playing or for automatic playing. Preferably, in operation of the machine a single record is placed initially on the turntable and the tone arm is manually positioned on such record when the machine is adjusted for either manual or automatic operation so that it becomes unnecessary to operate the reject switch 114 in order to position a record on the turntable 10. After a single record is threaded onto the turntable 10 and the remaining stack of records placed on the spindle shoulder 4 the record clamping arm is moved manually from its extreme stable retracted position to its second or clamping position wherein it is effective to exert some pressure on the stack of records thereby to maintain such stack of records in operating position with respect to the pusher plate 8 which is operated during the course of the record changing cycle. Simultaneously with movement of the record clamping arm 43 from its retracted position to its clamping position the arm 66 (Fig. 1) is withdrawn and the boom structure 11 is allowed to return to its normal position against spindle 3 unless prior thereto the boom structure was initially latched by operation of the control knob 31, the operation of which serves to permanently latch the boom structure out of the path of a falling record. As mentioned above, the boom structure 11 is otherwise allowed to move freely when the changer is conditioned for playing both sides of a record.

After completion of the playing of the record initially placed on the turntable 10, the record changing trip lever 107 is actuated either by reverse movement of the stylus of the tone arm traveling in a reverse direction or by moving too close to the center spindle 3. The actuation of lever 107 permits the supplementary gear portion 87 to engage the turntable gear 84 and cause one revolution of the one revolution mutilated gear 86 and one-half revolution of the one-half revolution gear 120 during which time a record changing cycle is effected. During such one-half revolution of the gear 120 the tone arm is initially raised by the vertical lift pin 156 as it is displaced from cam surface 173 to the upper surface of the one-half revolution disc 163 (Fig. 6). The tone arm is then moved outwardly due to engagement of the tone arm extension 164 with pin 130 projecting downwardly from the one-half revolution gear; and, subsequently the tone arm is returned to the starting position of a 10" or 12" record, as the case may be, due to contact between the automatically adjustable dog members 161 and 162 with the cam edge 160 of the tone arm plate 116. Also, during such one-half revolution of gear 120 pusher plate shaft 16, due to the connection therewith of the connecting link 132 (Fig. 4), is rotated in one direction to rotate the pusher plate 8 and thereby displace the bottommost record supported on the spindle shoulder 4. The displaced record falls onto the boom structure 11 upon which such record is rotated due to frictional engagement between the continuously rotating driving wheel 14 and the record. Under these circumstances the under side of the rotated record is exposed for playing by means of the upper stylus 151 of double tone arm 148 which is spring biased upwardly due to leaf spring 155 bearing against its under side, inasmuch as at this stage the tone arm raising pin 156 rests on the elevated cam surface 169 of the one-half revolution disc 163 (Fig. 5).

Then, after the completion of the playing of the under side of the record rotating on the boom structure 11, the record changer trip lever 107 is again tripped, as described previously, whereupon the one revolution gear 86 makes another revolution and the one-half revolution gear 120 makes a second one-half revolution to complete a full revolution. During such second one-half revolution of the one-half revolution gear 120 the connecting link 132 (Fig. 4) attached thereto and having a one-way clutch element 141 mounted on the free end thereof engages and moves the boom crank pin 145 and boom structure 11 to its retracted position, thus allowing the record supported thereon to fall by gravity onto the turntable 10 or the stack of records already on the turntable. Also, during such second one-half revolution of gear 120 the tone arm is allowed to drop from its engaging position on the under side of the record since the tone arm lift pin 156 is no longer on the raised cam portion 169 of the disc 163. The tone arm is moved outwardly due to engagement of the tone arm finger 164 with the pin 129 and then later moved inwardly again after the record has fallen from the boom structure 11 to the turntable 10. The tone arm is moved in to the correct starting position of the record due to the engagement between the tone arm cam plate 116 and the dog member 161 whose relative position on its supporting disc 163 remains the same as when the under side of such record was being played. During this second one-half revolution of the gear 120 a record is not fed from the spindle shoulder 4 but the pusher plate 8 is merely moved to a more advantageous position for subsequent displacement of a record during the next record changing period. Also, at the completion of such second one-half revolution of gear 120 the tone arm lift pin 156 is allowed to fall onto the depressed cam portion 173 (Fig. 6) in the disc 163 thereby to allow the tone arm to fall into starting position on the record now on the turntable. In the interim of the second one-half revolution of gear 120 the boom structure 11, since the boom crank pin 145 is moved out of engagement with the one way clutch element 141, is free to return under the influence of its biasing spring 30 to its normal position against the spindle 3 where the boom structure 11 is in position to intercept a record falling from the spindle shoulder 4.

It is noted that during such second one-half revolution of gear 120 a record does not fall through the space between spindle shoulder 4 and the boom structure 11 so that, in any event, the position of the record discriminator element 182 is not altered.

It is thus evident that when and as records of a stack are fed one by one to the turntable, first the under side of such records is played on the boom structure 11 and then later the top side of such records is played on the turntable 10.

*Single side record playing*

The apparatus is conditioned for single sided playing by manipulating the manual control knob 31 to move the boom structure 11 to a latched position. In such case, of course, the boom structure does not intercept a record falling from the spindle shoulder 4 and such record is free to fall onto the turntable 10. When the boom structure 11 is in its latched position for single sided playing the boom rod 115 (Fig. 4) has its end positioned for engagement with the cam member 119 fastened onto the upper side of the one-half revolution gear 120 so that the rod at the completion of one revolution of the one revolution mutilated gear 86 is moved into tripping engagement with the record changer tripping lever 107 thereby to automatically initiate a second rotation of the mutilated gear. That is, when the boom structure 11 is moved to latched position for single sided record playing the so-called single revolution mutilated gear 86 makes two revolutions per record changing cycle while the so-called one-half revolution gear 120 makes one complete revolution per record changing cycle.

Inasmuch as the one-half revolution gear 120 makes one revolution per record changing cycle when the changer is conditioned for single sided playing it is evident that during each revolution of gear 120 a record may be displaced from the spindle shoulder 4 so as to allow such record to fall onto the turntable 10. For this mode of operation the discriminator element 184 is still effective in each changing cycle to adjust the tone arm to correct initial starting position on a 10" or 12" record, as the case may be. It is noted that during each one-revolution of the gear 120 the tone arm is moved outwardly twice and may have what might be termed a "false" motion but, inasmuch as the tone arm is eventually placed in correct starting position on the record on the turntable, no objection is encountered in practice in giving such false motion to the tone arm.

In order to change the setting of the record changer from the setting where the one side of a stack of records is to be played to a setting where both sides of a stack of records is to be played it is necessary only to manipulate the control knob 31 in such a fashion as to release the boom latch to thereby allow the boom 11 to swing in normal position against the spindle 3 under the influence of its biasing spring 30.

*Reject mechanism*

In order to effect a so-called reject operation it is necessary only to close the normally open switch 114 (Fig. 14) which may for convenience be located on the control panel of a radio phonograph combination. Such normally open switch 114 is serially connected with the terminals of the power plug 113 and the solenoid winding 113 mounted in magnetic relationship to the record changer trip lever 107 which normally blocks the movement of the supplementary gear portion 87 to its otherwise normal spring biased engagement with the turntable shaft gear 84.

Upon energization of the solenoid 113 the record changer trip lever 107 is moved out of the path of movement of the supplementary gear portion 87 to allow it to engage the turntable shaft gear 84 thereby to initiate a record changing operation.

Throughout this specification reference is made to a one revolution shaft, gear, etc. as well as to a one-half revolution shaft, gear, disc, etc. By the use of these terms "one revolution" and "one-half revolution" reference is made to the fact that the specific part referred to makes one or one-half revolution, as the case may be, each time the record changer trip lever 107 is actuated. Although some of the elements designated as a one revolution or one-half revolution device may correspondingly make but one or one-half revolution, as the case may be, to effect a record changing operation when the changer is adjusted for double side playing the corresponding device may travel twice that angular distance when the changer is adjusted for single side playing. This occurs since the record changer trip lever 107 is actuated automatically by the rod 115 attached to the boom structure 11 when such boom structure is in retracted position corresponding to single side record playing. The trip lever 107 is actuated twice per record changing cycle when the apparatus is adjusted for single side playing. Therefore, the terms "one revolution" and "one-half revolution" have reference to the angular distance which the specified part moves when the apparatus is adjusted for double side playing. In particular, when the machine is adjusted for double side playing the mutilated gear 86 makes one complete revolution and the gear 120 and disc 163 both make one-half revolution for a changing cycle. When the apparatus is adjusted for single side playing, the mutilated gear makes two complete revolutions and the gear 120 and connected disc 163 both turn an angular distance of 360 degrees during a record changing cycle.

The boom structure 11 is so arranged that the driving roller 14 and idler rollers 12 and 13 journalled on the boom structure are arranged to support and rotate either a 10" or 12" record by engagement therewith at the center ungrooved portion of the record. As mentioned previously, the idler wheels 12 and 13 are of Bakelite material while the rim of the driving wheel 14 has on its periphery a material, such as rubber, which is softer than Bakelite. By thus using a combination of hard and soft rollers on the boom structure the driving of a record after it has fallen on the boom structure is stabilized.

It is noted that the two spring biased rollers 88 and 90 mounted with two degrees of freedom not only serve to take up lost motion but also, due to the manner in which they are supported, these wheels suppress forces which otherwise would produce objectionable vibration of the driving roller 14.

Also, it is noted that when the changer is adjusted to play but one side of a record the tone arm has imparted thereto a "false" motion mentioned above. Specifically this false motion constitutes a movement of the tone arm inwardly and then upwardly (to a position where in double sided operation a record would be supported). In the remainder of the cycle the tone arm moves downwardly and then outwardly and subsequently returns and falls at the starting groove of a record supported on the turntable 10.

Also, the structure 11 has for convenience been referred to as a boom structure but the words "record carriage" are equally descriptive of the structure 11.

When the changer is adjusted for double side record playing the tone arm is automatically raised to and maintained in an elevated position where it normally plays a record supported on the movable carriage 11 at the completion of the playing of the last record on turntable 10. This feature does not allow the last side of a record on turntable 10 to be played over and over again but gives a warning to the listener, because of the absence of sound, to the effect that all sides of all the chosen records have been played once and once only.

While a particular embodiment of the present invention has been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. In combination, in a record changer mechanism arranged to play either one or both sides of a phonograph record having a sound grooved portion and an ungrooved portion, means, including a movable record supporting and rotating structure upon which one side of a record is played, for playing both sides of a record, said record supporting and rotating structure being movable from an operative position wherein it is effective in playing one side of a record to an inoperative retracted position, said record supporting and rotating structure including rotatable record driving means arranged to engage and drive a record only at the ungrooved portion thereof, manually operated means for latching said supporting and rotating structure in retracted position, and means actuated upon operation of said manually operated means for automatically adjusting said first means to play only one side of a record.

2. The combination, in a record changer mechanism arranged to play both sides of a phonograph record having sound grooves and an inner area devoid of sound grooves, a pivoted boom structure having a plurality of rotatable means associated therewith for supporting and rotating a record in a first elevated position by engagement only with said inner circular area of the record, record reproducing means arranged to play said record in said first position, a rotatable turntable arranged to rotate the same record after playing in said first position in a second position below said first position, and means actuated upon the completion of playing said record in said first position for pivoting the entire boom structure out of record supporting position thereby to allow said record to fall by gravity onto said turntable.

3. The combination, in a record changer mechanism, arranged to play both sides of a phonograph record, a trip mechanism for effecting a record changing operation of the record changer mechanism, means for supporting a stack of records in an elevated position, a turntable upon which a record may fall in a path from said supporting means by gravity forces acting on such record, a movable structure positioned in an operative position in said path to intercept said record in an intermediate position when it falls to maintain it in supported position for playing the under side thereof, said movable structure being movable from said operative position to an inoperative retracted position, stylus means, actuated by the record changer mechanism to a position out of the path of a falling record, for playing the underside of a record supported on said movable structure, and means actuated upon movement of said movable structure from its operative position to its retracted inoperative position, when it supports a record, for operating said trip mechanism thereby to actuate the stylus means to said position out of the path of a falling record to thereby allow such falling record to fall onto the turntable.

4. The combination, in a record changer mechanism, arranged to play both sides of either a large or small diameter record, a horizontal turntable, means arranged to support a stack of records and to feed them one by one onto said turntable by gravity forces acting thereon, movable record supporting and rotating means disposed between said feeding means and said turntable and arranged to intercept a falling record, stylus means arranged to play the bottom side of a record when rotated on said record rotating means and to play the top side of the same record on the turntable when allowed to fall thereon, stylus positioning means actuated upon the completion of the playing of a record for positioning said stylus means vertically above the starting groove of the record to be played, said stylus positioning means including but one record discriminator element positioned in the path only of a falling large diameter record and actuated to correctly position said stylus means for playing both the bottom and top sides of the same record.

5. The combination, in a record changer mechanism, arranged to play both sides of a phonograph record, which is allowed to fall by gravity in a path from a first supported position onto a record turntable, a movable structure positioned in said path to intercept said record in an intermediate position when it falls to maintain it in supported position for playing one side thereof, said structure having at least one driving wheel and at least one idler wheel mounted thereon for rotating said record, by contact of the rims of such wheels with the record, the diameters of such wheels being less than the distance between said intermediate position and said turntable, drive means for driving said driving wheel, the rim of said driving wheel being of softer material than the material on the rim of said idler wheel to stabilize the position of the record on said structure.

6. The combination, in a record changer mechanism arranged to play both sides of a phonograph record, first means for supporting a stack of records in an elevated position, a turntable in a lower position, movable record supporting means for supporting and rotating a record in a position intermediate between said elevated and lower positions, manually movable means arranged to press said stack of records against said first supporting means, and means actuated upon manual movement of the last mentioned means for simultaneously moving said movable record supporting means out of said intermediate position thereby to allow a record to be moved between said first means and said turntable without touching said movable record supporting means.

7. The combination, in a record changer mechanism arranged to play either both sides or one side of a record and having record supporting and feeding means for feeding records one by one in a path onto the turntable, a trip mechanism arranged to start said record changer mechanism thereby to initiate a record changing operation, said mechanism including one-half revolution means arranged to rotate one-half revolution per record changing operation when said trip mechanism is actuated and the mechanism is adjusted for playing both sides of a record, automatically operable means arranged to stop movement of said mechanism after said one-half revolution means has rotated one-half of a revolution, movable record supporting and rotating means movable from a retracted position out of said record path into an operative position in said record path to intercept and rotate a record in an intermediate position, stylus means actuated by said record changer mechanism and arranged to play one side of said record on said record supporting and rotating means and the other side of said record on said turntable, means arranged to hold said record supporting and rotating means in its retracted position, said record feeding means and stylus means being actuated upon rotation of said one-half revolution means, and means actuated upon movement of said record supporting and rotating means from its operative position to its retracted position for tripping said trip mechanism at the completion of a first one-half revolution of said one-half revolution means to allow a succeeding one-half revolution of such one-half revolution means thereby to adjust the record changing mechanism from its both side record playing condition to its single side record playing condition.

8. In a record player of the central spindle type, a mechanism for supporting a record disc in a horizontally disposed playing position and for rotating said record disc about said spindle comprising: a unitary carriage movable between an inactive position and said record playing position; a frame member supported in a horizontal plane at one extremity of said carriage and recessed to receive and be substantially coaxial with the spindle of said record player when said carriage is in said record playing position; a plurality of record supporting wheels rotatably supported by said frame member and, when said carriage is in said recording playing position, disposed angularly relative to said spindle with their uppermost surfaces conjointly determining a horizontally disposed supporting plane for said record disc; a mechanical driving system extending through said carriage and mechanically coupled to at least one of said wheels for driving said one wheel to rotate a record disc supported by said wheels about said spindle; means effective during operating intervals when said carriage is in said record playing position for actuating said driving system; means for tracking one surface of a record disc supported and rotated by said wheels; and means responsive to the operation of said tracking means for moving said carriage to said inactive position after playing of said record.

RALPH A. MULLANEY.
KURT EMDE.
HERBERT H. STEGLICH.

REFERENCES CITED

The following references are of record in the file of this patent:

UNITED STATES PATENTS

| Number | Name | Date |
|---|---|---|
| 1,454,134 | Nyquist | May 8, 1923 |
| 2,043,789 | Ansley | June 9, 1936 |
| 2,063,199 | Slater | Dec. 8, 1936 |
| 2,068,449 | Downs | Jan. 19, 1937 |
| 2,318,654 | Wissner | May 11, 1943 |
| 2,355,790 | Faulkner | Aug. 15, 1944 |
| 2,374,080 | Dale | Apr. 17, 1945 |
| 2,435,264 | Ansar | Feb. 3, 1948 |

FOREIGN PATENTS

| Number | Country | Date |
|---|---|---|
| 822,026 | France | Dec. 18, 1937 |
| 541,156 | Great Britain | Nov. 14, 1941 |
| 111,950 | Sweden | Sept. 26, 1944 |